(12) United States Patent
Oliveria Da Silva et al.

(10) Patent No.: US 10,699,359 B2
(45) Date of Patent: Jun. 30, 2020

(54) PARAMETER ADJUSTMENTS BASED ON STRENGTH CHANGE

(71) Applicant: Hewlett-Packard Development Company, L.P., Houston, TX (US)

(72) Inventors: Renato Oliveria Da Silva, Porto Alegre (BR); Lucio Cossio, Porto Alegre (BR); Andre Rabelo, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 132 days.

(21) Appl. No.: 15/762,898

(22) PCT Filed: Nov. 30, 2015

(86) PCT No.: PCT/US2015/062996
§ 371 (c)(1),
(2) Date: Mar. 23, 2018

(87) PCT Pub. No.: WO2017/095376
PCT Pub. Date: Jun. 8, 2017

(65) Prior Publication Data
US 2018/0276781 A1    Sep. 27, 2018

(51) Int. Cl.
*G06T 1/00*    (2006.01)
*G06T 7/90*    (2017.01)
(Continued)

(52) U.S. Cl.
CPC .......... *G06T 1/005* (2013.01); *G06T 1/0028* (2013.01); *H04N 1/32144* (2013.01); *H04N 1/32352* (2013.01); *H04N 5/232* (2013.01); *H04N 5/2351* (2013.01); *H04N 5/2353* (2013.01); *H04N 5/243* (2013.01); *G06T 7/90* (2017.01); *G06T 2201/0061* (2013.01);
(Continued)

(58) Field of Classification Search
None
See application file for complete search history.

(56) References Cited

U.S. PATENT DOCUMENTS 7,054,461 B2    5/2006    Zeller et al.
7,154,560 B1    12/2006    Chang et al.
(Continued)

FOREIGN PATENT DOCUMENTS

KR    10-1319132 B1    10/2013
WO    WO-2015047877    4/2015

OTHER PUBLICATIONS

Reed, et al Watermarking Spot Colors in Packaging, Jan. 2014. https://www.digimarc.com/docs ~ 14 pages.

*Primary Examiner* — Soo Shin
(74) *Attorney, Agent, or Firm* — HP Inc. Patent Department

(57) ABSTRACT

In an example, a capture system includes a content capture mechanism, an isolation engine, a mark strength engine, and a parameter controller. In that example, the isolation engine generates mark data, the mark strength engine identifies a first variance level in a first region of a first set of mark data, and the parameter controller adjusts a parameter of the content capture mechanism in accordance with a strength change based on a comparison of the first variance level to a second variance level in a first region of a second set of mark data.

13 Claims, 5 Drawing Sheets

(51) Int. Cl.
*H04N 1/32* (2006.01)
*H04N 5/232* (2006.01)
*H04N 5/235* (2006.01)
*H04N 5/243* (2006.01)

(52) U.S. Cl.
CPC ............ *G06T 2201/0065* (2013.01); *G06T 2201/0202* (2013.01); *G06T 2207/20021* (2013.01)

(56) References Cited

U.S. PATENT DOCUMENTS

| | | |
|---|---|---|
| 7,756,290 B2 | 7/2010 | Rhoads |
| 8,027,510 B2 | 9/2011 | Rhoads |
| 8,923,546 B2 | 12/2014 | Reed |
| 9,615,012 B2* | 4/2017 | Geiss ............... H04N 5/2258 |
| 2002/0057823 A1 | 5/2002 | Sharma et al. |
| 2010/0150396 A1* | 6/2010 | Reed ................ G06T 1/0021 382/100 |
| 2012/0062754 A1* | 3/2012 | Huang ............. H04N 5/23248 348/208.99 |
| 2014/0270330 A1 | 9/2014 | Pometun et al. |
| 2015/0168538 A1 | 6/2015 | Bradley et al. |
| 2015/0243029 A1 | 8/2015 | Herling et al. |
| 2019/0158813 A1* | 5/2019 | Rowell ............. H04N 9/8205 |

* cited by examiner

PARAMETER ADJUSTMENTS BASED ON STRENGTH CHANGE

BACKGROUND

Electronic devices generally communicate and/or store information. For example, visual information, such as a digital photo, may be captured by a digital camera. Information may be concealed in a photo using a steganographic technique that conceals information. For example, a watermark may be visually hidden to perception by an average human within a human-perceptible image. Such marks may be perceptible by a machine even if beyond the capabilities of a human

DETAILED DESCRIPTION

In the following description and figures, some example implementations of capture apparatus, capture systems, and/or methods of image parameter adjustment are described. Information may be concealed within other information using steganography, such as by embedding a watermark within a digital image. In steganography, a payload represents the covert data that is to be at least partially hidden and a carrier represents information that is to at least partially hide the payload. A carrier may be a signal, a data stream, or a data file, for example. As used herein, a mark refers to the payload and mark data refers to data that represents pixel values of the payload.

A digital image with an embedded mark may be printed and scanned, such as by a camera or optical sensor. For example, a user may see a picture in a magazine and may use a mobile phone device to scan the picture in the magazine. A machine, such as a capture mechanism, may perform a scan that identifies the concealed information using a mark technique to identify specific pixel attributes related to the mark. For example, often the captured image is sent to a mark detector in its original form, where the mark content is mixed to some extent with the image that is embedding it. Scanning content for a mark becomes increasingly difficult as embedded payload information improves in imperceptibility within the carrier content.

Various examples described below relate to adjusting a parameter of a capture device to capture content with settings that, for example, improve detection of a mark. For example, an exposure parameter of a capture device may be able to change, where a change in the parameter corresponds to a change in the result of capturing the content, and the detection system of the device may have varying results of detection when the parameter changes. By controlling the parameter adjustments based on analysis of the mark strength, a capture device, for example, may be dynamically optimized to settings that provide an improved chance of detecting the mark with accuracy and/or reliability.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

Figure 1:
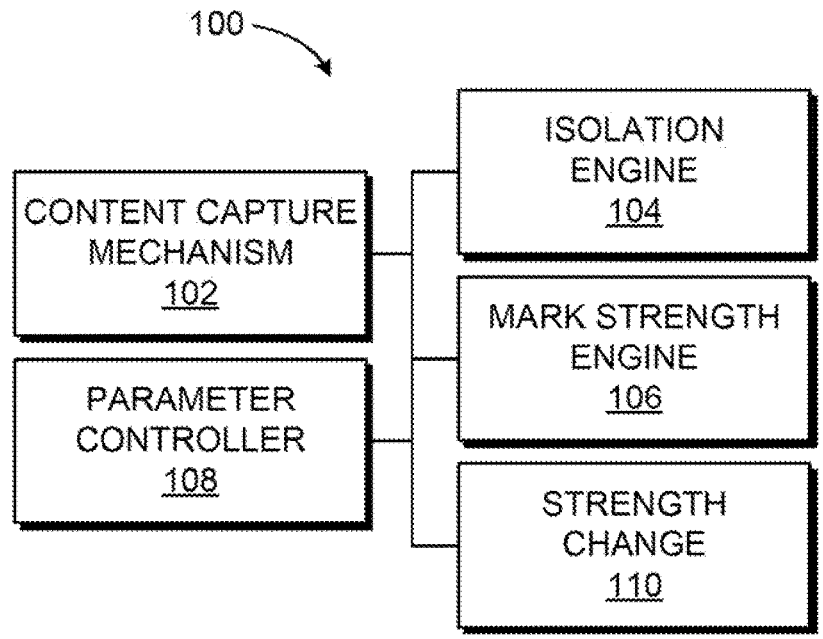
FIGS. 1 and 2 are block diagrams depicting example capture systems.
Figure 2:
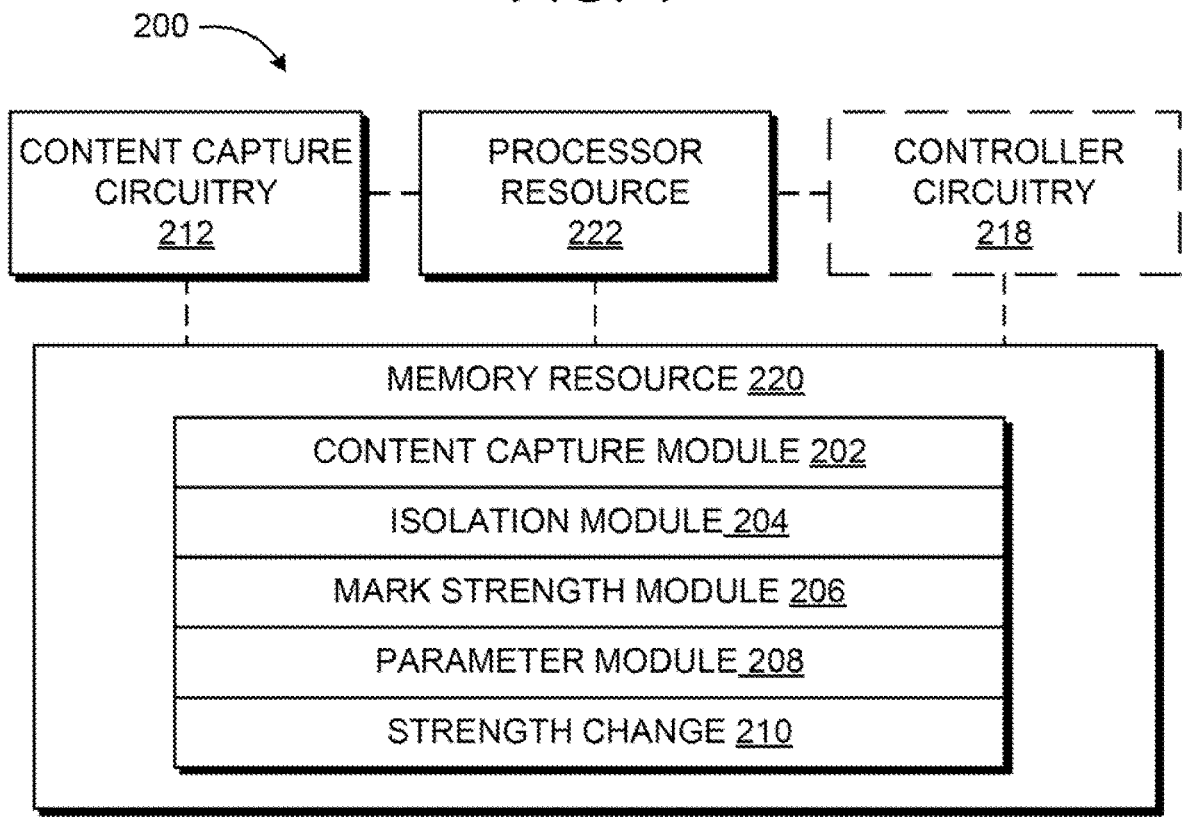

FIGS. 1 and 2 are block diagrams depicting example capture systems 100 and 200. Referring to FIG. 1, the example system 100 of FIG. 1 generally includes a content capture mechanism 102, an isolation engine 104, a mark strength engine 106, and a parameter controller 108. In general, the parameter controller 108 adjusts a parameter for capturing content via the content capture mechanism 102 based on a strength change 110 of a mark isolated by the isolation engine 104 and evaluated by the mark strength engine 106. As used herein, strength change, such as strength change 110, refers to a change in strength of the mark, where strength refers to the detectability of the mark (e.g., a level of ability to detect the mark by a detection system).

The content capture mechanism 102 represents any circuitry or combination of circuitry and executable instructions to capture visual content. For example, the content capture mechanism 102 may be a camera lens operated by a controller to capture light using an image sensor and produce digital content (e.g., an image or video) to store on the data store of a capture device or a remote location via a wireless network connection. The system 100 may utilize and interact with the content capture mechanism 102 via adjusting parameters used to capture the content, such as by reviewing each frame of a video and automatically adjusting parameters to increase mark detection, for example.

The isolation engine 104 represents any circuitry or combination of circuitry and executable instructions to generate mark data using a mark technique. As used herein, the mark technique may be any steganographic operation(s) that defines and/or uses a relationship between input channels to identify mark data that represents concealed information. In one example, the mark technique may correlate with data contained in a green channel of red, green, and blue (RGB) layered image data. For another example, the mark technique may define isolating the mark from the image content from a U chrominance channel and a V chrominance channel which identify the range of colors used by the mark technique. The isolation engine 104 may generate mark data based on the entirety of source data or partial set of source data such as a mark technique based on a single input color channel or a mark technique based on a first input color channel data from source data and a second input color channel data from the source data.

The mark technique may generally emphasize a particular channel, chrominance, or other classification of pixel values that identify pixels associated with a mark. The mark technique may utilize channels with a complementary relationship to isolate the pixel data associated with a mark. In a multi-channel example, the first input color channel data is associated with a first input color channel that is correlated to a second input color channel associated with the second input color channel data based on a chrominance emphasis associated with the mark technique, and the combined input color channel may comprise mark data. The isolation engine 104 may separate the channels from the source or receive the source data as data sets already separated into channels. A channel, as used herein, refers to data representing portions of visual information of a color space. Visual information may be visual components of image content or video content, where the data may be supplied as stored data, data streams, and/or a signal, which are forms of data encompassed herein when referring to data related to a channel. For example, a channel may be an array of values where three arrays of values represent data for a color component for red green blue (RGB) components of RGB color space. For another example, a channel may refer to an array of luminance values, such as in a YUV color space. A color space, as used herein, is a mapping of a description of colors registerable by a sensor (e.g., a human eye) to physically producible colors. Example color spaces include RGB, YUV, XYZ, cyan magenta yellow black (CMYK), hue saturation value (HSV), lightness with A and B color-opponent dimensions (LAB), and the like.

In one example of a mark technique, the mark is embedded in multiple channels where the channels are encoded in opposing directions. In that example the isolation engine 104 may combine the first input color channel and the second input color channel to produce a combined input color channel that is a subset of the source data (e.g., sum the U chrominance channel and the V chrominance channel to produce a UV channel data set) and may discard other channel data such as a third input channel data from the source data (e.g., discard the Y luminance channel). The isolation engine 104 may produce a single-channel data set derived from combining multiple channels, such as combining a U color channel and a V color channel that are complementary channels with respect to encoding direction to produce a UV color channel. The first input color channel data and the second input color channels may be combined in a variety of ways by the isolation engine 104. Some examples include performing an averaging operation that generates a single channel with pixel values that are the average values of the first and second channel or by performing a sum operation that adds the values of the first and second channels to generate a single channel with pixel values of the added values of the first and second channels.

The mark strength engine 106 represents any circuitry or combination of circuitry and executable instructions to identify a first variance level in a first region of a first set of mark data. For example, the mark strength engine 106 may compute a standard deviation of contrast in a region to identify the variance level and assign a score to the region based on the identified variance level. The mark strength engine 106 may divide the mark data into a number of regions and classify the contrast variance at each region to evaluate the strength of the mark at that region. For example, the mark strength engine 106 may segment, partition, or otherwise divide the first set of mark data into a number of regions and evaluate the strength in each region by comparing variance levels between two captured images. The mark strength engine 106 may, for example, identify a first variance level of a first region of a first set of mark data, identify a second variance level of a first region of a second set of mark data (where the first region has the same bounds on respective frames to improve accuracy of the comparison, for example) and compare the variances to identify a change. In that example, the mark strength engine 106 may identify a first variance level and the corresponding second variance level of the first region in separate frames and record an identifier representative of the variance levels so that the identifiers may be compared. The number of regions divided into by the mark strength engine 106 may be greater than two, such as three regions, four regions, eight regions, sixteen regions, etc., and the number of regions may be based on the desired accuracy of detection of the mark.

The mark strength may be computed at each region by the mark strength engine 106 and then a classifier, such as a score, may be determined to represent the strength. For example, the mark strength engine 106 may compute a first standard deviation of contrast in the first region to identify the first variance level, compute a second standard deviation of contrast in the first region of the second set of mark data to identify the second variance level, determine a first strength score for the first region based on the first variance level, and determine a second strength score for the first region of the second set of mark data based on the second variance level. The mark strength engine 106 may assign the determined scores to the corresponding regions and maintain the scores in a data store. For example, the mark strength engine may assign the first strength score to the first region based on a first variance level and assign a second strength score to the first region based on a second variance level.

The mark strength engine 106 may determine a strength change 110 based on the identified variance levels, and/or strength classifiers for each frame. For example, a strength change score may be designated for each of the number of regions from a corresponding difference between the first strength score of the region of the first respective frame and the second strength score of the region of the second respective frame. By providing classifiers with numerical values, such as scores, the difference between the scores may be computed by the mark strength engine 106. For example, the difference of mark detectability may be computed by taking the difference between the second strength score and the first strength score to identify whether the mark has increased in strength or decreased in strength between the changes in the captured data. In this manner, the difference between scores may represent a change in strength of the mark, and a strength change 110 in the mark may be used by the parameter controller 108 to adjust the parameters of the capture device.

The parameter controller 108 represents any circuitry or combination of circuitry and executable instructions to adjust a parameter of the content capture mechanism in accordance with a strength change 110. The strength change may be any identifier capable of describing a change, such as a value, a number, a character, a string, a label, a classification, etc. The strength change may be based on a comparison of the first variance level to a second variance level in a first region of a second set of mark data the corresponds to the first region of a first set of data associated with the first variance level. For example, an overall strength change may be computed based on a plurality of regional differences between a first frame of mark data and a second frame of mark data. The parameter controller 108 may determine the direction of change and may use the direction of change to determine the direction of adjustment of a parameter. For example, the parameter controller 108 may identify a direction of change based on the overall strength difference and a parameter difference (e.g., a difference in parameter levels) between a first captured image associated with the first frame and a second captured image associated with the second frame cause the exposure parameter to adjust in the identified direction of change and cause an exposure parameter to adjust in accordance with a strength change based on a comparison of a first strength score of the first region for the first frame and a second strength score of the first region for the second frame.

The parameter controller 108 may track or otherwise determine the parameter level associated with the captured data. For example, the parameter controller 108 may identify a first parameter level used with the first respective frame associated with the first set of mark data, identify a second parameter level used with the second respective frame associated with the second set of mark data, compare the strength change score for each of the number of regions, increase the parameter when a first subset of regions of the number of regions that have a positive strength change is greater than a first composition threshold, and decrease the parameter when a second subset of regions of the number of regions that have a negative strength change is greater than a second composition threshold. In this manner, the capture device may continue to be adjusted via the parameter controller in the direction of change of parameter level or identify when to reverse the change in adjustment to the parameter level when the mark strength decreases.

The parameter controller 108 may adjust any number of parameters associated with settings of the content capture mechanism 102. For example, an exposure parameter may be used that generally adjust multiple sensors and computations regarding exposure based on the level of exposure represented by the exposure parameter. The exposure parameter may be adjusted when a majority of the regions indicate the mark strength has changed in a direction. For example, the mark strength engine 106 may perform a comparison of a first strength score of the first region of the first set of mark data to a second strength score of the first region of the second set of mark data and determine a strength change score for the corresponding first regions of the respective image frames based on the comparison, and the parameter controller 108 may count a number of regions associated with an improved change in the strength score and cause either a positive contrast change in exposure settings of an image capture device when a number of improved image sections achieves a majority (e.g., when the number of the plurality of image regions associated with an improved change does not achieve a majority number of the total regions) or cause a negative contrast change in the exposure settings of the image capture device when the number of improved image sections does not achieve a majority. Other example settings that affect the detectability of a mark may be adjusted by the parameter controller in this manner.

In some examples, functionalities described herein in relation to any of FIGS. 4-8 may be provided in combination with functionalities described herein in relation to any of FIGS. 4-8.

FIG. 2 depicts the example system 200 may comprise a memory resource 220 operatively coupled to a processor resource 222. Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as a content capture module 202, an isolation module 204, a mark strength module 206, and a parameter module 208. The content capture module 202, the isolation module 204, the mark strength module 206, and the parameter controller 208 represent program instructions that when executed function as the content capture mechanism 102, isolation engine 104, the mark strength engine 106, and the parameter controller 108 of FIG. 1, respectively. The modules 202-208 may be executed via processor resource 222, content capture circuitry 212, and/or controller circuitry 218 to function as the components 102-108 of FIG. 1.

The content capture circuitry 212 represents any circuitry usable to capture (or assist in capture) of content. Example circuitry includes a lens, a beam splitter, an image sensor (such as an analog semiconductor charge-coupled device (CCD) image sensor or an active pixel sensor in a complementary metal-oxide-semiconductor (CMOS) image sensor), a sensor chip, etc. The content capture circuitry may be adjusted according to settings. Example settings include exposure compensation, exposure time, sensor sensitivity, aperture size, white balance, and the like. The controller circuitry 218 represents any circuitry usable to implement particularized management of hardware, such as a parameter controller that controls hardware of the capture device (e.g., the content capture mechanism) to determine how content is captured. For example, controller circuitry may comprise a sensor and a chip that includes a processor resource, a memory resource, and electrical components to control the sensor by executing a control program on a processor resource of the chip particular to operations of the sensor of the capture device. In that example, the controller circuitry may operate in accordance with a strength change 210, which represents the same as strength change 110 of FIG. 1.

The processor resource 222 may carry out a set of instructions to execute the modules 202, 204, 206, 208 and/or any other appropriate operations among and/or associated with the modules of the system 200. For example, the processor resource 222 may carry out a set of instructions to segment a first frame into a plurality of regions, segment a second frame into the plurality of regions, identify a first variance level of a first region of the plurality of regions for the first frame, identify a second variance level of the first region for the second frame, and cause an exposure parameter to adjust in accordance with a strength change 210 based on a comparison of a first strength score of the first region for the first frame and a second strength score of the first region for the second frame. For another example, the processor resource 222 may carry out a set of instructions to assign the first strength score to the first region based on the first variance level, assign a second strength score to the first region based on the second variance level, and compute a first region difference between the second strength score and the first strength score. For yet another example, the processor resource 222 may carry out a set of instructions to compute an overall difference based on a plurality of regional difference between the first frame of mark data and the second frame of mark data, identify a direction of change based on the overall strength difference (e.g., strength change 210 when it represents the overall change in strength) and a parameter difference, and cause an exposure parameter to adjust in the identified direction of change. In the above examples, the instructions may be carried out by the processor resource 222, the content capture circuitry 212, and/or the controller circuitry 218 of a parameter controller, such as parameter controller 108.

Figure 5:
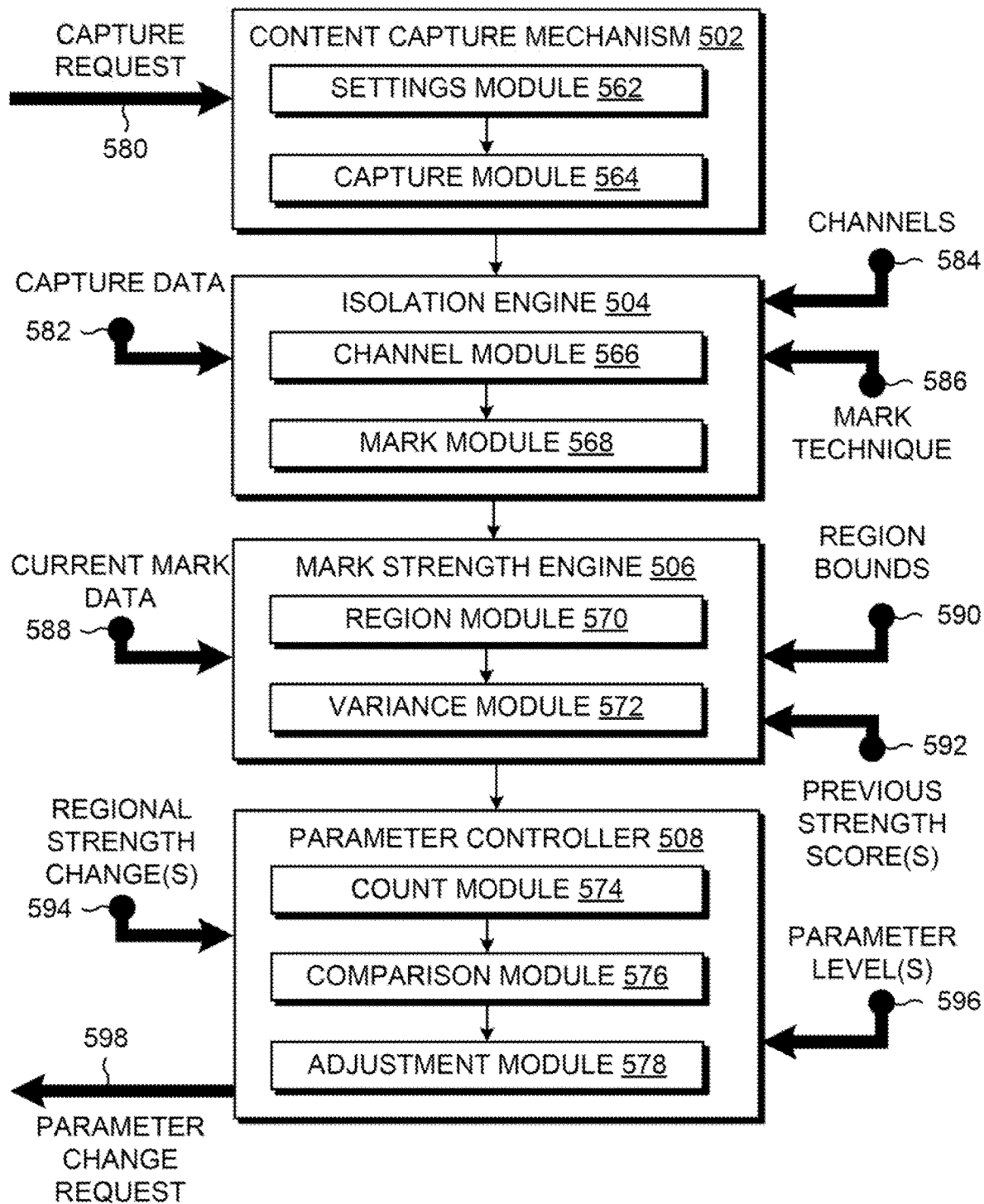

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 5 depicts yet another example of how functionality may be organized into modules.

The processor resource 222 is any appropriate circuitry capable of processing (e.g., computing) instructions, such as one or multiple processing elements capable of retrieving instructions from the memory resource 220 and executing those instructions. For example, the processor resource 222 may be a central processing unit (CPU) that enables parameter adjustment by fetching, decoding, and executing modules 202, 204, 206, and 208. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. The processor resource 222 may process the instructions serially, concurrently, or in partial concurrence.

The memory resource 220 represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. As used herein, a non-transitory storage medium refers to any storage medium with the exclusion of a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 (and/or other circuitry or components) to implement functionality of the system 200 of FIG. 2. The memory resource 220 may be integrated in the same device as the processor resource 222 or it may be separate but accessible to that device and the processor resource 222. The memory resource 220 may be distributed across devices.

In the discussion herein, the components 102, 104, 106, and 108 of FIG. 1 and the modules 202, 204, 206, and 208 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

In some examples, the system 200 may include the executable instructions may be part of an installation package that when installed may be executed by the processor resource 222 to perform operations of the system 200, such as methods described with regards to FIGS. 4-8. In that example, the memory resource 220 may be a portable medium such as a compact disc, a digital video disc, a flash drive, or memory maintained by a computer device, such as a server from which the installation package may be downloaded and installed. In another example, the executable instructions may be part of an application or applications already installed, such as an application installed on a capture device 300 of FIG. 3. The memory resource 220 may be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive.

Figure 3:
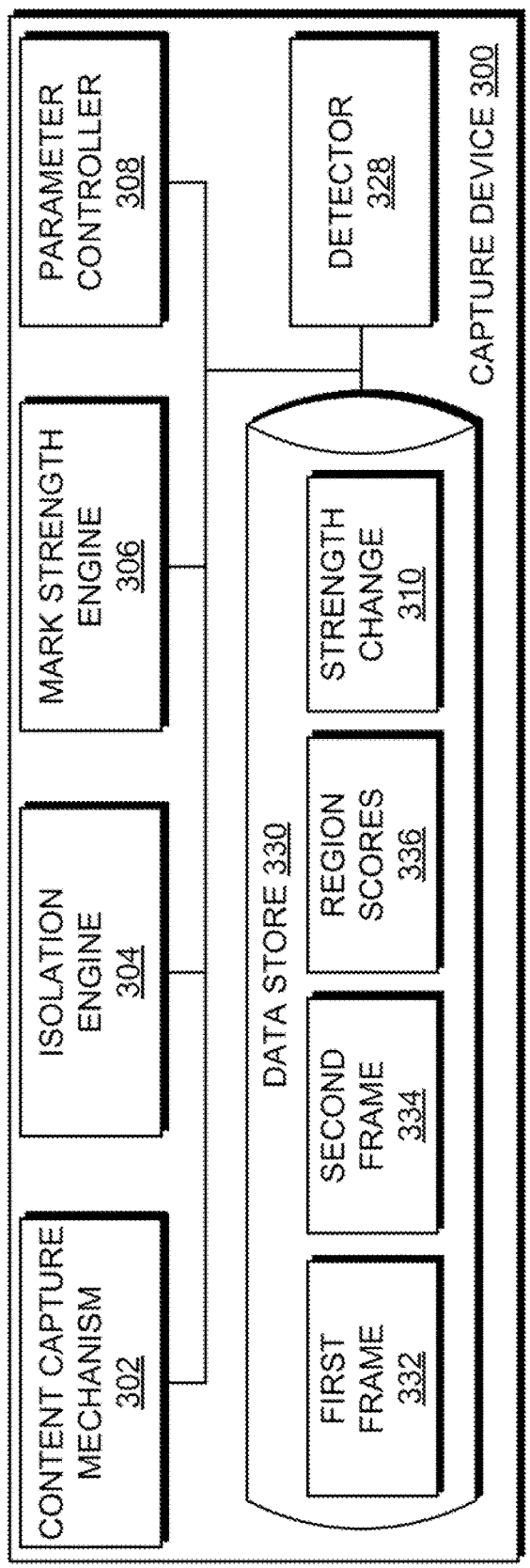
FIG. 3 depicts an example device in which various example capture systems may be implemented.

FIG. 3 depicts an example device 300 in which various example capture systems may be implemented. The device 300 comprises a system (described herein with respect to FIGS. 1 and 2) that may represent generally any circuitry or combination of circuitry and executable instructions to adjust parameters of a capture device. The system 300 may include a content capture mechanism 302, an isolation engine 304, a mark strength engine 306, and a parameter controller 308 that are the same as the content capture mechanism 102, the isolation engine 104, the mark strength engine 106, and the parameter controller 108 of FIG. 1, respectively, and the associated descriptions are not repeated for brevity. Example capture devices include a digital camera, a mobile telephone, a tablet computer, a security camera, an optical sensor, and the like.

The capture device 300 may further include a detector 328 (e.g., a detection system) and a data store 330. A detector, as used herein, represents any circuitry or combination of circuitry and executable instructions that receives an input, identifies the data representing a mark from the input, and identifies information from the identified mark data. For example, a detector may include a barcode scanner that is able to receive an image embedded with a set of vertical lines (e.g., the mark), identifies data in the image representing the set of lines, and identifies a number based on the set of lines. For another example, a detector may include a scanner that is able to receive an image embedded with color variations that are distributed at various locations in the image (e.g., the mark), identifies a pixel pattern associated with the color variations, and identifies information, such as a uniform resource locator (URL), based on the pixel pattern. The input for the detector for examples described herein may be the original content source data (used to produce the first frame 332 and the second frame 334) and/or the channel data prepared based on the original content source data.

The data store 330 may contain information utilized by the components 302, 304, 306, and 308. For example, the data store 330 may store a first frame 332 of mark data, a second frame 334 of mark data, a set of bounds that define the regions to evaluate, region scores 336, a strength change 310, a change direction, etc.

As shown in FIG. 3, the components 302, 304, 306, 308, 328, and 330 may be integrated into a compute device, such as a capture device 300. For example, the components 302, 304, 306, 308, 328, and 330 may be integrated via circuitry or as installed instructions into a memory resource of the compute device. Referring to FIGS. 1-3, the components 102, 104, 106, and 108 of FIG. 1; the modules 202, 204, 206, and 208 of FIG. 2; and/or the components 302, 304, 306, 308, 328, and 330 may be distributed across compute devices. The engine, modules, and/or components may complete or assist completion of operations performed in describing another engine and/or module. For example, the isolation engine 304 of FIG. 3 may request, complete, or perform the methods or operations described with the isolation engine 104 of FIG. 1 as well as the mark strength engine 106 and the parameter controller 108 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example methods described in connection with FIGS. 4-8.

Figure 4:
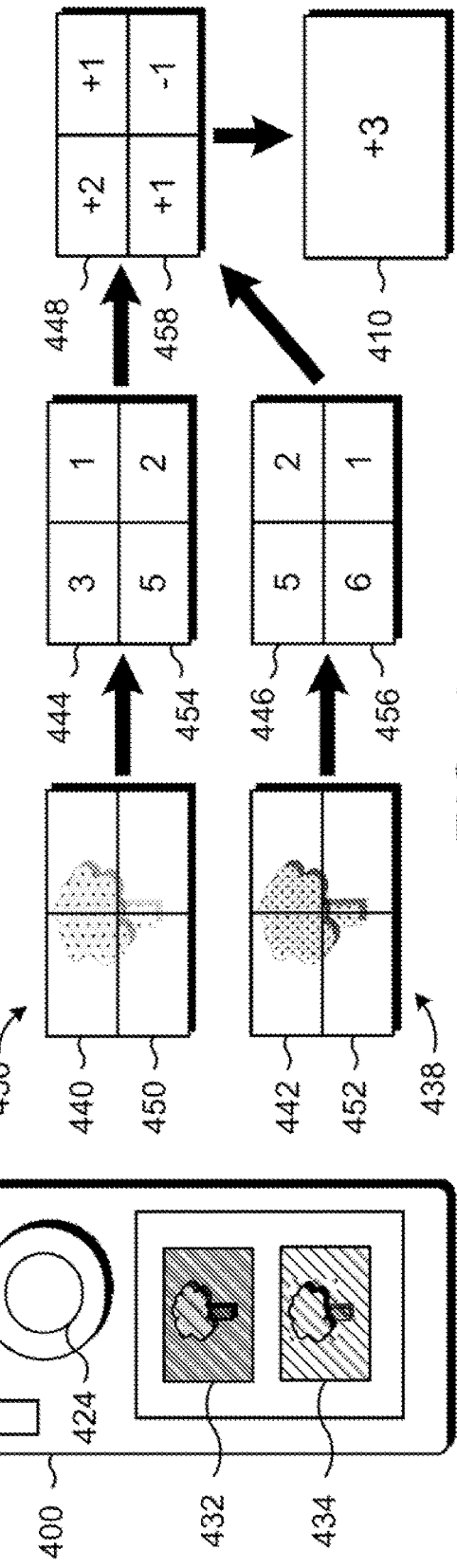
FIGS. 4 and 5 depict example operations used to implement example capture systems for parameter adjustment.

FIGS. 4 and 5 depict example operations used to implement example systems for adjusting a parameter of a capture device. FIG. 4 depicts an example image capture device 400 that includes the same components as the capture device 300 of FIG. 3. The image capture device 400 has a lens 424 as part of the content capture mechanism 302 to capture images. The image capture device 400 is depicted in FIG. 4 as storing a first captured image 432 and a second captured image 434. The stages of operations of the image capture device 400 are depicted as blocks and arrows in FIG. 4 and the engines and modules associated with the operations are depicted in FIG. 5. In general, FIG. 4 depicts a first frame 436 of mark data (isolated by the isolation engine 304 based on the first captured image 432) being separated into multiple regions (e.g., 440 and 450); a second frame 438 of mark data (isolated by the isolation engine 304 based on the second captured image 434) being separated into multiple regions (e.g., 442 and 452) that correspond to the regions of the first frame (e.g., 440 corresponds to 442 and 450 corresponds to 452); computing mark strength scores (via the mark strength engine) for the regions of each frame (e.g., scores 444, 454, 446, and 456); identifying the differences (e.g., 448 and 458) between the scores of the first frame and the scores of the second frame; and evaluating an overall strength change 410 between the first frame 436 and the second frame 438. In the example of FIG. 4, three regions improved in strength, while one region decreased in strength, and in this particular example, the strength change 310 is the total number of improved regions regardless of the regions with worse strengths, however other implementations and representations of the strength change are contemplated.

FIG. 5 depicts example components used to implement example operations to adjust a parameter of a capture device, such as capture device 400 of FIG. 4. Referring to FIG. 5, the example components of FIG. 5 generally include a content capture mechanism 502, an isolation engine 504, a mark strength engine 506, and a parameter controller 508 that represent the content capture mechanism 302, the isolation engine 304, the mark strength engine 306, and the parameter controller 308 of FIG. 3, respectively. The example components of FIG. 5 may be implemented on a compute device, such as capture device 400 of FIG. 4.

A content capture mechanism 502 may include any mechanical components that capture an image, such as using a lens and/or an optical sensor. The content capture mechanism 502 may capture and store images on a capture device, such as capture device 400. The content capture mechanism 502 may be activated based on a capture request 580 that initiates operations to capture an image using the components of the content capture mechanism 502. The content capture mechanism 502 may include program code, such as a settings modules 562 and a capture module 564, that facilitate capture of content. The settings module 562 represents executable instructions that when executed by a processor resource cause the capture device to set a parameter of the content capture mechanism (e.g., adjust exposure time of an image sensor via a parameter controller). The capture module 564 represents executable instructions that when executed by a processor resource cause the capture device to store information from an optical sensor at the settings set via a processor resource executing the settings module 562. The parameter level 596 may be noted when the content is captured by the content capture mechanism 502, such as by storing the information on a memory resource and/or a log of capture operations.

A capture request 580 may cause the isolation engine 504 to isolate mark data in an image (e.g., represented by capture data 582) captured by the content capture mechanism 502. The isolation engine 504 may include program instructions, such as input module 566 and mark module 568, that facilitate isolating the mark (e.g., data comprising the payload) from the carrier information in the captured image. The input module represents executable instructions that when executed by a processor resource cause the capture device to retrieve source data of the captured content from the channels 584 and identify the complementary channels that produce mark data as defined by the mark technique 586. The mark module 568 represents program instructions that when executed by a processor resource that isolate the mark data by combining the complementary channels and produce a single channel data set based on the combination (e.g., using an averaging operation or a summation operation) defined by the mark technique 586.

The mark strength engine 506 receives the isolated mark data 588 identified by the isolation engine 504 and scores each region of the current mark data 588 with a strength score based on a mark detection metric. The mark strength engine 506 may include program code, such as a region module 570 and a variance module 572, to facilitate identifying scores for each region. The region module 570 represents program instructions that when executed by a processor resource cause the capture device to identify a region of pixels of the current mark data 588 based on the region bounds 590. The variance module 572 represents executable instructions that when executed by a processor resource cause the capture device to identify a variance of pixel data at the region, such as by identifying a standard deviation of intensity levels (e.g., a variation of values from pixel to pixel) in that region. The mark strength engine 506 then calculates a score for the region based on the variance. The mark strength engine may compare the current scores calculated for each region with the previous strength scores 592 to identify a change in score at each region, if any.

The parameter controller 508 may receive the regional strength change(s) 594 to determine the overall strength change and identify a parameter adjustment in accordance with the overall strength change. The parameter controller 508 may include program instructions (such as a count module 574, a comparison module 576, and an adjustment module 578) to facilitate identification of an adjustment to be made on settings of the capture device. The count module 574 represents executable instructions that when executed by a processor resource cause the capture device to count the number of regions that had a positive change in the strength score and/or count the number of regions that had a negative change in the strength score. The comparison module 576 represents executable instructions that when executed by a processor resource cause the capture device to compare the number of regions with a positive change to a threshold (and/or the number of regions with a negative change to a threshold) and identifies a direction of change based on the comparison. The adjustment module 578 represents executable instructions that when executed by a processor resource cause the capture device to determine a change in the parameter level 596 between the captured data 582 and the previously captured data represented by the previous strength score(s) 592 and identify an adjustment of the parameter in the direction of change of the mark strength in accordance with the change in parameter level between the captured data 582 and the historical data (e.g., previous strength score(s) 592). The parameter controller generates a parameter change request 598 to modify the parameters of the capture device, such as the operational state of the content capture mechanism 502. In this manner, the capture device may adjust the parameter in the direction of the change of parameter level 596 when the strength improves or in the opposite direction when the strength worsens, and, thus, for example, dynamically optimizes the settings for the next set of captured data to have a detectable mark and/or improve the detectability of the mark.

Figure 6:
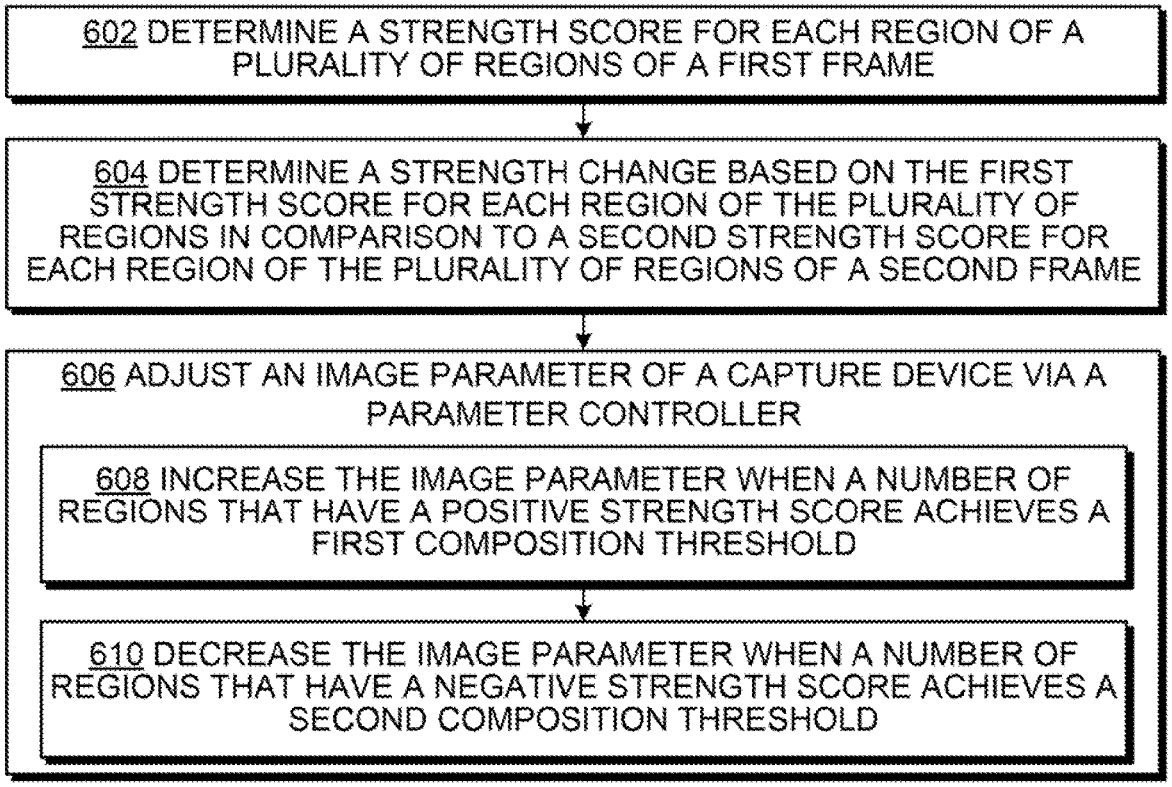
FIGS. 6-8 are flow diagrams depicting example methods of in age parameter adjustment.
Figure 7:
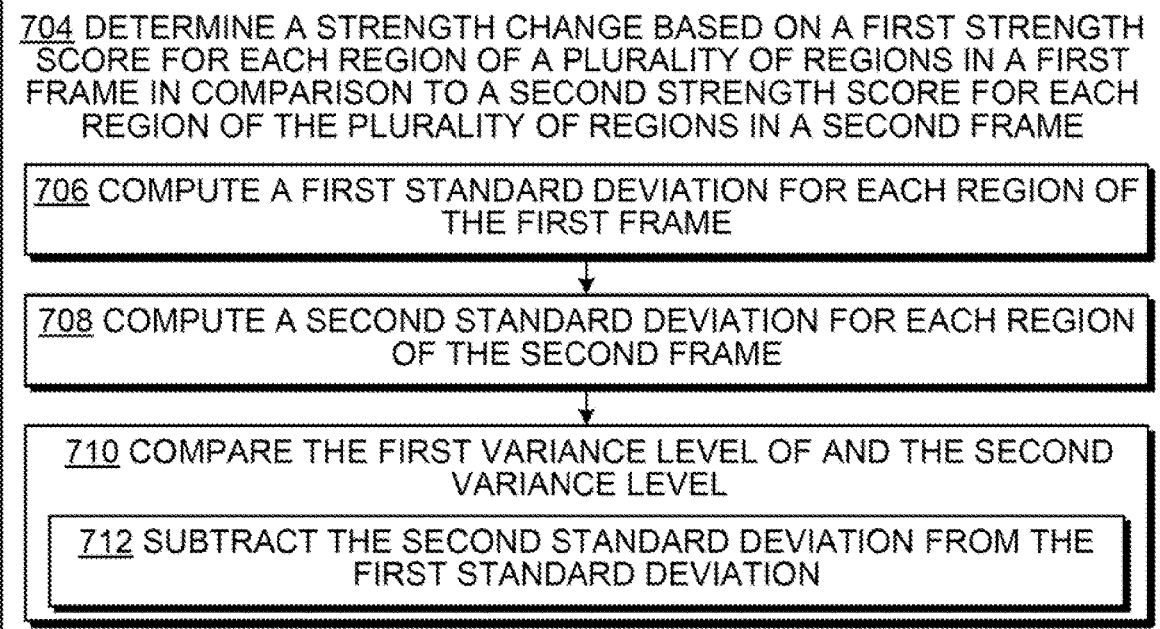
Figure 8:
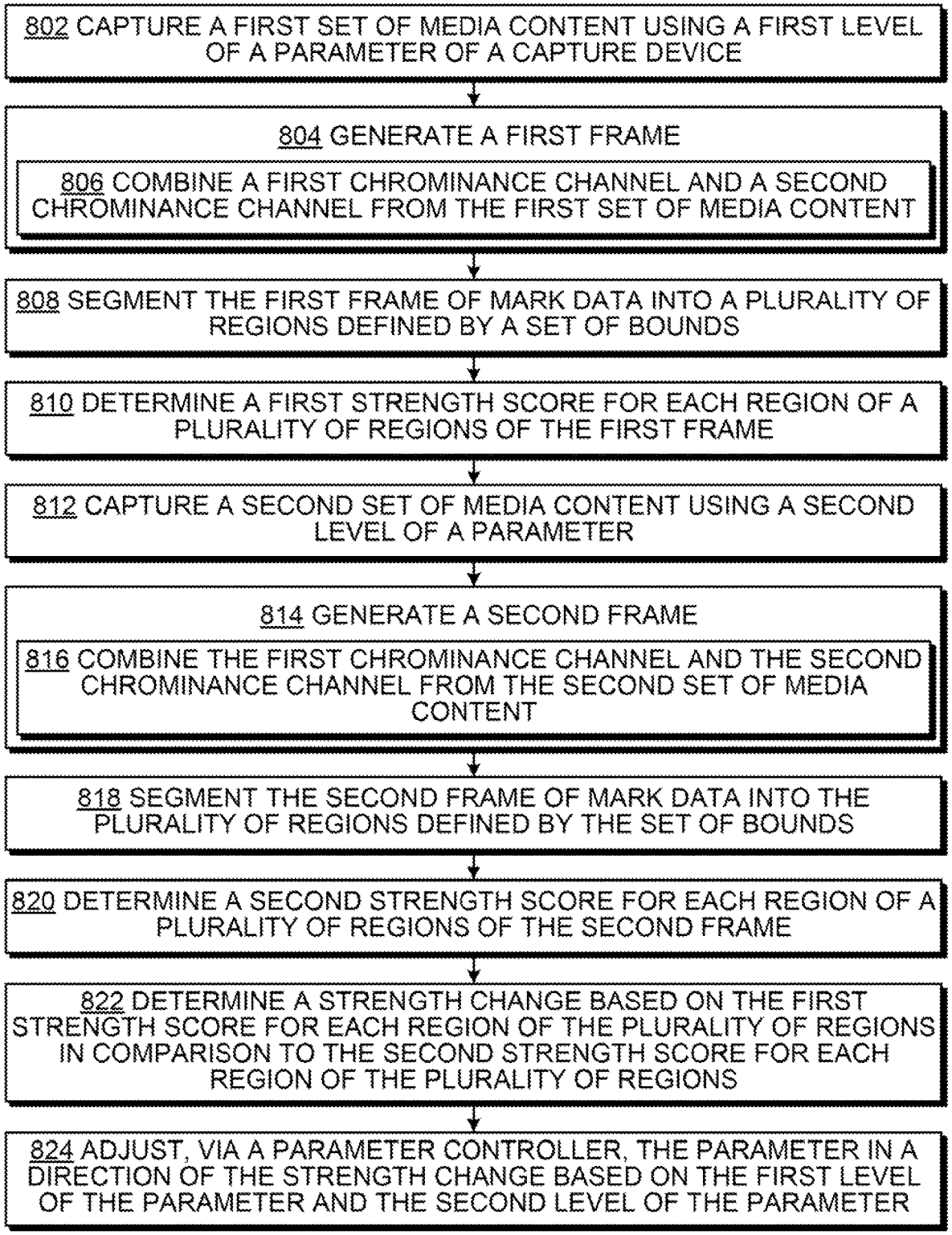

FIGS. 6-8 are flow diagrams depicting example methods of image parameter adjustment. Referring to FIG. 6, example methods of image parameter adjustment may generally comprise determining a strength score for each region of a frame, determining a strength change based on the strength scores, and adjusting an image parameter of a capture device based on the strength change. The example methods of FIGS. 6-8 are performable by a content capture mechanism, an isolation engine, a mark strength engine, and/or a parameter controller, such as the content capture mechanism 102, the isolation engine 104, the mark strength engine 106, and/or the parameter controller 108 of FIG. 1.

At block 602, a strength score is determined for each region of a plurality of regions of a first frame. For example, a mark strength engine, such as mark strength engine 106 of FIG. 1, may evaluate the contrast of isolated pixel intensities and assign a score to the degree of contrast in each region of the frame (e.g., a regional strength score may be relative to the level of variance of intensity values at each region). The mark data of isolated pixel intensities may be identified by, for example, computing an average of UV color channels of a YUV image and generating a one channel image from the average, the one channel image to contain watermark information that is stronger than the YUV image when the UV color channels are encoded in complementary chrominance directions. At block 604, a strength change is determined based on the first strength score for each region of a plurality of regions in comparison to a second strength score for each region of the plurality of regions of a second frame.

At block 606, an image parameter of a capture device is adjusted via a parameter controller, such as parameter controller 108 of FIG. 1. The image parameter is adjusted based on the direction of the strength change for each region in accordance with block 608 and 610. At block 608, the image parameter is increased when a number of regions that have a positive strength score (e.g., the strength score of the region in the second frame is higher than the strength score of the region in the first frame) achieves a first composition threshold. At block 610, the image parameter is decreased when a number of regions that have a negative strength score (e.g., the strength score of the region in the second frame is lower than the strength score of the region in the first frame) achieves a second composition threshold. The composition thresholds discussed herein represent the amount of regions that achieve a change in a particular direction. The composition thresholds may be a particular number of regions, a percentage, a classification, a particular set of region locations, and/or other like condition to achieve. The composition threshold may be set in accordance with the parameter and/or mark detection characteristic. For example, a small improvement of a few regions, even if not a majority, may be desirous and a low threshold, such as 20% of the regions of the frame, may be set. For another example, a parameter may affect image quality and a higher composition of improvement, such as 80% of the regions may be desired before an adjustment is made. The first composition threshold and the second composition threshold of FIG. 6 may be the same threshold.

Referring to FIG. 7, further details regarding determining a strength change are depicted. Block 704 represents a block similar to block 604 of FIG. 6, as well as additional details regarding computing variance levels. Determining a strength change may include computing a first standard deviation for each region of a first frame and a second standard deviation for each region of a second frame where the standard deviations represent an estimation of a variance of regional information and the variance identifies a watermark in a captured image. At block 706, a first standard deviation of pixel values is computed for each region of the first frame. At block 708, a second standard deviation of pixel values is computed for each region of the second frame. The first variance level and the second variance level are compared at block 710 based on the difference between the standard deviations identified at blocks 706 and 708. For example at block 712, the second standard deviation may be subtracted from the first standard deviations (e.g., a second score representative of a second standard deviation of a region may be subtracted from a first score representative of the first standard deviation of the region).

FIG. 8 includes blocks similar to blocks of FIG. 6 and FIG. 7 and provides additional blocks and details. In particular, FIG. 8 depicts additional blocks and details generally regarding increasing pixel contrast by scaling the intensities to another range and sending a request to a detector. Blocks 810 (and 820), 822, and 824 are similar to blocks 602, 604, and 606 of FIG. 6, respectively, and, for brevity, their respective descriptions are not repeated in their entirety.

At block 802, a first set of media content is captured using a first level of a parameter of a capture device. At block 804, a first frame is generated from an image source is separated into a plurality of input channels. A frame may be generated by combining a first chrominance channel and a second chrominance channel from a media content captured using an exposure compensation parameter at a first level. For example, an isolation engine, such as the isolation engine 104 of FIG. 1, may separate the content source into a U chrominance channel, a V chrominance channel, and a Y luminance channel. At block 806, a first channel is combined with a second channel based on a mark technique. For example, an isolation engine, such as the isolation engine 104 of FIG. 1, may identify complementary channels to combine as used by the mark technique to identify the mark (such as U and V channels encoded in opposing directions may be combined). Since used in the decoding manner of the mark technique, the result of the combination is the mark data being isolated, at least partially, from the carrier information. The proper mark decoding technique that corresponds to the encoding technique is to be used when selecting the channels to combine. At block 808, the first frame of mark data is segmented into a plurality of regions defined by a set of bounds and a first strength score is determined for each region at block 810. The strength score and/or strength change may be determined based on a change in contrast of a watermark associated with a difference between a first variance level and a second variance level.

Similarly, at blocks 812, 814, 816, 818, and 820, a second set of media content is captured, a second frame is generated and segmented, and strength score determinations are made for a second image. In this manner, the strength change between the first image and the second image is possible at block 822 and a parameter adjustment is accordingly made at block 824 in the direction of the strength change based on the first level of the parameter during the capture at block 802 and the second level of the parameter during the capture at block 812. The example methods described herein may continually be applied so that the parameter levels automatically adjust to, for example, improve the detectability of the mark when sent to a detection system.

Although the flow diagrams of FIGS. 4-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A capture system comprising:
   a camera device to capture source data of an image in which a mark is embedded;
   a processor;
   a memory storing instructions executable by the processor to:
   generate first and second sets of mark data based on a first color channel data from the source data, the first color channel data of a first color channel having a pixel value emphasis to identify pixels associated with the mark;
   identify a first variance level in a first region of the first set of mark data and a second variance level in a corresponding first region of the second set of mark data; and
   adjust a parameter of the camera device in accordance with a strength change from the first variance level to the second variance level,
   wherein the camera device is to capture additional source data of the image after adjustment of the parameter, the strength change being greater in the additional source data as compared to the source data.

2. The system of claim 1, wherein the instructions are executable by the processor to further:
   produce a one-channel data set derived from combining a U color channel and a V color channel,
   wherein the U color channel and the V color channel are complementary channels with respect to encoding direction.

3. The system of claim 1, wherein the instructions are executable by the processor to further:
   divide the first set of mark data into a number of regions greater than two, the first region being one of the number of regions,
   wherein the first region of the first set of mark data and the corresponding first region of the second set of mark data corresponding to a same bounds on respective frames.

4. The system of claim 3, wherein the instructions are executable by the processor to further:
   compute a first standard deviation of contrast in the first region to identify the first variance level; and
   compute a second standard deviation of contrast in the corresponding first region of the second set of mark data to identify the second variance level.

5. The system of claim 3, wherein the instructions are executable by the processor to further:
   determine a first strength score for the first region based on the first variance level;
   determine a second strength score for the corresponding first region of the second set of mark data based on the second variance level; and
   designate a strength change score for each of the number of regions from a corresponding difference between the first strength score of the region of the first respective frame and the second strength score of the region of the second respective frame.

6. The system of claim 5, wherein the instructions are executable by the processor to further to:
   identify a first parameter level used with the first respective frame associated with the first set of mark data;
   identify a second parameter level used with the second respective frame associated with the second set of mark data;
   compare the strength change score for each of the number of regions;
   increase the parameter when a first subset of regions of the number of regions that have a positive strength change is greater than a first composition threshold; and
   decrease the parameter when a second subset of regions of the number of regions that have a negative strength change is greater than a second composition threshold.

7. The system of claim 1, wherein the instructions are executable by the processor to further:
   for each of a plurality of regions of the first set of mark data, including the first region, perform a comparison of a first strength score of the region of the first set of mark data to a second strength score of a corresponding region of a plurality of corresponding regions of the second set of mark data, including the corresponding first region;
   for each region, determine a strength change score based on the comparison;
   count a number of the plurality of regions associated with an increase in the strength score;
   cause a positive contrast change in exposure settings of an image capture device when the counted number is a majority; and
   cause a negative contrast change in the exposure settings of the image capture device when the counted number is not achieve a majority.

8. A non-transitory computer-readable storage medium comprising a set of instructions executable by a processor resource to:
   segment a first frame captured using a first level of a parameter into a plurality of regions;
   segment a second frame captured using a second level of the parameter into a plurality of corresponding regions;
   for each of the plurality of regions, identify a first variance level;

for each of the plurality of corresponding regions, identify a second variance level;
for each of the plurality of regions, determine a difference between the first variance level and the second variance level;
compute an overall difference based on the determined difference for each region;
identify a direction of change of the overall difference; and
adjust an exposure parameter in the identified direction of change.

9. A method of image parameter adjustment comprising:
for each of a plurality of regions, determining a first strength score based on a first variance level;
for each of a plurality of corresponding regions, determining a second strength score based on a second variance level;
for each of the plurality of regions, determining a strength change using the first strength score in comparison to the second strength score;
increasing an image parameter of a capture device when a number of the plurality of regions that have a positive strength score change achieves a first composition threshold; and
decreasing the image parameter when a number of the plurality of regions that have a negative strength score change achieves a second composition threshold.

10. The method of claim 9, further comprising:
segmenting a first frame captured using a first level of a parameter into the plurality of regions; and
segmenting a second frame captured using a second level of the parameter into the plurality of corresponding regions.

11. The method of claim 9, further comprising:
generating the first frame by combining a first chrominance channel and a second chrominance channel from a first media content captured using an exposure compensation parameter at a first level; and
generating the second frame by combining the first chrominance channel and the second chrominance channel from a second media content captured using an exposure compensation parameter at a second level,
wherein, for each region, the strength score is determined based on a change in contrast of a watermark associated with a difference between the first variance level and the second variance level.

12. The method of claim 9, further comprising:
computing an average of U and V color channels of a YUV image; and
generating a one channel image from the average of the U and V color channels, the one channel image to contain watermark information that is stronger than the YUV image when the UV color channels are encoded in complementary chrominance directions.

13. The method of claim 9, wherein, for each region, determining the first strength score comprises computing a first standard deviation,
wherein, for each corresponding region, determining the second strength score comprises computing a second standard deviation, the first and second standard deviations representing an estimation of a variance of regional information where the variance identifies a watermark in a captured image,
and wherein determining the strength change comprises subtracting the second standard deviation from the first standard deviation.

* * * * *